(12) United States Patent
Baumann et al.

(10) Patent No.: US 7,746,845 B2
(45) Date of Patent: Jun. 29, 2010

(54) SUPPORT FOR FAX AND MODEM IN SIP/SIP-T NETWORKS AND THE INTERWORKING OF THESE NETWORKS WITH ISUP+/BICC

(75) Inventors: Thomas Baumann, Holzkirchen (DE); Klaus Hoffmann, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1182 days.

(21) Appl. No.: 10/513,589

(22) PCT Filed: Oct. 17, 2003

(86) PCT No.: PCT/DE03/03456
§ 371 (c)(1),
(2), (4) Date: Nov. 4, 2004

(87) PCT Pub. No.: WO2004/045182
PCT Pub. Date: May 27, 2004

(65) Prior Publication Data
US 2006/0013194 A1 Jan. 19, 2006

(30) Foreign Application Priority Data
Nov. 14, 2002 (DE) .............................. 102 52 989

(51) Int. Cl.
*H04L 12/66* (2006.01)
(52) U.S. Cl. .................. 370/352; 379/221.08; 370/353; 370/354; 370/355
(58) Field of Classification Search ............ 379/221.08; 370/352, 353, 354, 355
See application file for complete search history.

(56) References Cited

U.S. PATENT DOCUMENTS

| 2001/0036176 A1 | 11/2001 | Girard |
| 2003/0193696 A1* | 10/2003 | Walker et al. ............... 358/402 |
| 2003/0227908 A1* | 12/2003 | Scoggins et al. ............ 370/352 |

FOREIGN PATENT DOCUMENTS

| WO | WO 01/78418 A1 | 10/2001 |
| WO | WO 02/41574 A2 | 5/2002 |

OTHER PUBLICATIONS

Chang-Sup Keum, Young-Il Choi, Ho-Jin Park, Byung-Sun Lee: "SDL Pattern-based Desing for SIP-T Protocol in a Softswitch System", Proceedings of the lasted International Conference Communication System and Networks, Malaga, Spain, Sep. 9-12, 2002, pp. 326-331, XP009025336.

* cited by examiner

*Primary Examiner*—Ahmad F Matar
*Assistant Examiner*—Khai N Nguyen
(74) *Attorney, Agent, or Firm*—Laurence A. Greenberg; Werner H. Stemer; Ralph E. Locher

(57) ABSTRACT

The invention relates to a method for the transmission of call control parameters for switching over between a voice transfer mode and a data transfer mode between two media gateway controllers (6, 7), which are used by way of an IP network between two telecommunication terminal devices separated from any medium or bearer connection, whereby the call control parameters are transferred with conversion into the SIP or SIP_T protocol or from this into a standard signaling protocol.

21 Claims, 3 Drawing Sheets

SUPPORT FOR FAX AND MODEM IN SIP/SIP-T NETWORKS AND THE INTERWORKING OF THESE NETWORKS WITH ISUP+/BICC

CROSS REFERENCE TO RELATED APPLICATIONS

This application is the US National Stage of International Application No. PCT/DE03/03456, filed Oct. 17, 2003 and claims the benefit thereof. The International Application claims the benefits of German application No. 10252989.2 DE filed Nov. 14, 2002, both of the applications are incorporated by reference herein in their entirety.

FIELD OF INVENTION

Support for fax and modem in SIP/SIP-T networks and the interworking of these networks with ISUP+/BICC.

BACKGROUND OF INVENTION

The invention relates to a method for the transmission of call control parameters for switching over between a speech transmission mode and a data transmission mode between two media gateway controllers, which are used by way of an IP network between two telecommunication terminal devices separated from any medium or bearer connection.

Service providers, in other words companies which, based for example on the transport services of the partial networks (backbones) of the internet, provide their customers or users with switched data communication facilities, are faced in the communications sector primarily with the challenges associated with introducing new fast and efficient services. In this situation, the network infrastructure for connection network operators (carriers) is a significant cost factor whereby cost savings can be achieved by means of successful optimization.

Before dealing with the question as to how a service provider can take advantage of the data signaling for service management solutions, it is however necessary to consider what the customer is expecting of a service provider who is supplying value added facilities and services. At present, the expectation comprises a whole spectrum of integrated services, a simple and uniform accounting process in real time, and also comprehensive access to measurable and recorded standards of service.

In order to nevertheless achieve an optimization of the operating costs in the case of a service provider despite their provision of comprehensive services, steps are now being taken to set up communication connections which perform the connection setup (call) and the medium or bearer setups separately from one another. As a result, it is possible to revert to a relatively low-cost bearer technology for through-connection of the speech/data channel, whilst for example the signaling is handled separately.

If a disconnection (decomposition) of the connection setup and the medium or bearer setup is carried out, a communication is then needed between at least two media gateway controllers which are used during connection setup for data signaling purposes.

The Diagram in FIG. 1 demonstrates how, in the case of such a disconnection of connection setup and bearer setup, the information required for the setup of a communication connection between two telecommunication terminal devices 1, 2 is exchanged between the individual network components. In this situation, an A subscriber requests a call setup to a telecommunication terminal 2 of a B user, by means of a telecommunication terminal 1 which is connected to a first public telephone network (PSTN) 3 with an associated local switching centre (Local Exchange; LE) 5.

This call request results in a connection setup which takes place by means of two media gateway controllers (MGC) 6, 7. In this situation, information is transmitted by means of a corresponding signaling protocol (Common Channel Signaling CCS:ISUP) to a first media gateway controller 6. The latter communicates for its part with a second media gateway controller 7 by way of a BICC CS2/ISUP+ interface via Q.765.5 BAT (Bearer Application Transport). The second media gateway controller 7 thus receives all the service or performance features which are required in order to setup the connection, and transmits this information to a public telephone network 4 in which the terminal device 2 of the B subscriber is located. The transmission takes place in turn by way of a corresponding signaling protocol.

On the basis of the prior art, it is known that by introducing suitable communication between a media gateway controller and the associated media gateway the cost-effective bearer technologies such as IP can be applied to through-connection of the speech/data channel. At the present time, there exists the ITU-T Standard Q.1902.X BICC CS2 (Bearer Independent Call Control Capability Set 2) with a special Service Indicator in the case of the MTP (Message Transfer Part), and Q.765.5 BAT (Bearer Application Transport) which when employing IP-RTP as the bearer technology describes how its usual services are to be provided to the end user in the telecommunication network when there is a disconnection between connection setups and through-connection of the speech/voice channel. In the meantime, IETF has produced RFC 3204 (ISUP MIME Type) which enables the tunnel transport of ISUP messages in SIP messages. Such SIP messages for the purpose of media gateway controller intercommunication are also referred to as SIP-T messages.

A disadvantage that has become apparent in respect of the known solution is the fact that with regard to intercommunication between media gateway controllers themselves information can only be transmitted between the media gateway controllers by way of the BICC CS2/ISUP+ interface via Q.765.5 BAT (Bearer Application Transport). This holds true particularly when a modification of the bearer is required for the data transmission. Thus, in the case of a fax switchover for example, it is not possible at the present time to transfer the information required for this purpose between the media gateway controllers by means of a SIP protocol because the interworking of SIP to BICC is not yet defined in the ITU-T Standards for BICC CS2. The SIP protocol—in contrast to BICC—is suitable not only as a subscriber protocol for voice connections but also for multimedia (voice and data) and will for this reason acquire an increasing significance from the global viewpoint.

SUMMARY OF INVENTION

As a result of the described disadvantages arising from the prior art, the object of the present invention is to set down a method whereby it is possible to transmit messages between media gateway controllers by way of the SIP_T protocol and whereby it is also possible in particular in the case of a connection setup which is performed separately from the through-connection of a B-channel (bearer establishment) to transfer the information used for modification of the bearer via the BICC CS2/ISUP+ interface of the media gateway controllers.

In this situation, messages are understood to comprise all the basic information that is transferred as call control parameters for example between the media gateway controllers. In this situation, a delimitation should be noted in particular from signals which are exchanged for example for signaling purposes between the media gateway controllers. Such messages could for example contain the type of information which indicates that a codec needs to be switched over on both sides for a communication connection, as is required say in the case of a fax or modem transmission.

The object is achieved by implementing the type of method described at the beginning whereby the call control parameters are transmitted with conversion into the SIP or SIP_T protocol or from this into a standard signaling protocol.

The advantage of the invention consists particularly in the fact that it comprises a method which is especially easy to implement and equally as effective and which allows a service provider to take advantage of the data signaling for an extended range of service management solutions. The invention incorporates the fundamental concept of employing a mapping of ISUP messages in the signaling protocol. The method proposes the integration of the messages in the protocol for the management of multimedia sessions by inserting message cells containing the messages to be transmitted into containers of the signaling protocol or onto the SDP level or BAT Q.765 level. As a result of the mapping, the messages which are required for modification of the bearer are inserted into the SDP level or BAT Q.765 level of the protocol for the management of multimedia sessions, which allows bearer-independent signaling information to be exchanged by way of the SIP, SIP-T or BICC CS2/ISUP+ interface between the media gateway controllers.

Preferred developments of the invention are set down in the subclaims.

An especially preferred embodiment is thus provided in order to make use of IP technology for through-connection of speech/data channels in order that the data transfer takes place by way of an IP network after establishment of the communication connection between the telecommunication terminal devices. The advantage of this embodiment consists particularly in the fact that in this situation an especially low-cost and widespread bearer technology is used, which leads to a cost saving on the part of the service provider.

By particular preference, use is made for call control purposes of BICC protocols (particularly the BICC CS2-ISUP+ protocol) as signaling protocols, which are signaling protocols for operator-independent call control. As a result, the network operator is in a position to offer a complete set of PSTN/ISDN service including all supplementary services over a large number of transport networks. As a rule, however, other signaling protocols can also be considered for use in this situation.

In a preferred embodiment of the present invention, provision is made whereby, in the case of a fax transmission which is detected on one side on the basis of a fax tone, this is signaled to the other side by way of the media gateway controller. In this situation, the message exchanged is the information indicating that the IP codec should be switched over on both sides of the connection, thereby enabling a fax transfer. To this end, the codec must be switched over to the G.711 or T.38 codec. In addition, the Maximum Jitter Buffer Size is increased on both sides and the Silence Suppression is deactivated. The Echo Cancellation remains unchanged. As a rule, the Echo Cancellation is activated for a voice call, which also improves the quality of the data transmission between the fax devices in the case of a fax call. The situation is similar for a modem transmission: When a modem tone is detected, the IP codec is likewise switched over, whereby only the codec G.711 can be used here. The Maximum Jitter Buffer Size is likewise increased and the Silence Suppression is deactivated. The Echo Cancellation is also deactivated.

The task is now to transmit these call control parameters, which hitherto have been present in the standard signaling protocol, in a suitable manner into the SIP or SIP_T protocol. This is done in the SDP part of the SIP/SIP_T message in accordance with RFC2327. The proposed solution functions for SIP and SIP_T, and the designation "SIP" therefore always stands for both interfaces in the following.

As an example of this the following table shows a possible implementation of the conversion of BICC parameters in the SDP part and vice versa, which is explained in detail afterwards. It should be noted that the BICC parameters are shown in the left-hand column of the table and the associated SDP part appears in the right-hand column. It should be noted that when a "SIP:200 OK" acknowledgment message is converted in the BICC, only one Action Indicator is set up in the SIP.

| Q.765.5 Info Element APM (APP) BICC | SDP Element (re-INVITE) SIP |
|---|---|
| Action Indicator | The info element "Action Indicator" is implicitly transferred in the SDP session. |
| Single Codec | SDP Media Description Field, mediaformat (payload type number) SDP Attribute "rtpmap"(Codec Mapping) SDP Attribute "fmtp" (Codec parameter) |
| Echo Cancellation | SDP Attribute "ecan" (see RFC3108) |
| Action Indicator successful modified | 200 OK |

According to the above example, the BICC CS2/ISUP+ message for a fax or modem codec switchover contains the following info elements as per Q.765.5: (A) Action Indicator, (B) Single Codec and (C) Echo Cancellation, whereby the latter is a proprietary element. These info elements are discussed in detail in the following (A) Action Indicator (Identifier 0x00000001):

The info element "Action Indicator" contains the value "modify codec" (0x00001011) if the codec switchover is initiated by a media gateway controller. It is not converted to SDP but is regenerated on the other side if a "SIP:re-INVITE" message is received with an SDP session which contains one of the codecs described below for the data transfer (see Single Codec). During the conversion of the info element "Action Indicator" into the SIP protocol, the connection address of the RTP port remains unchanged.

The info element "Action Indicator" contains the value "successful codec modification" (0x00001100) if the remote media gateway controller has successfully performed the codec switchover and acknowledges the "SIP_T:re-INVITE" or SIP message. Here the initiating side receives a "SIP:200 OK" acknowledgment with an SDP session which contains precisely the same codec for the data transfer and can thus regenerate the Action Indicator. The connection address of the RTP port also remains unchanged in this case during the conversion of the info element "Action Indicator" into the SIP protocol.

(B) Single Codec (Identifier 0x00000101):

The info element "Single Codec" is a proprietary identifier and contains the codec which must be switched over to for the fax or modem data transfer. In this situation, there are two possible codec values at the present time:

(i) "G.711 64 kbit/s A-law Modem Transparency"

This codec is transferred if the codec G.711 is to be used without Silence Suppression and with a high Maximum Jitter Buffer value for the fax or the modem transfer.

In a possible implementation of the method according to the invention, a proposal is made to convert this codec to SDP in accordance with the IETF Draft "draft-foster-mmusic-vb-dformat-01.txt". Accordingly, this could be done by:

Specifying a dynamic codec in the "m=" line:
m=audio 3456 RTP/AVP 99

Assigning the MIME subtype "vbd" (voiceband data traffic) to this codec:
a=rtpmap:99 vbd/8000

Assigning the "underlying" audio format (e.g. 8=PCMA) to this codec:
a=fmtp:99 8

The other side is thereby informed that the voice codec is to be set to G.711 for a data transmission. Thus the Maximum Jitter Buffer can also be automatically raised and the Silence Suppression can be deactivated.

(ii) "ITU-T Recommendation T.38 Codec Based on UDP"

It is sufficient here for example, in accordance with "ITU Recommendation T.38, Amendment 2", to resume a modified SDP Media Description with mediatype "image", protocol "udptl" and payloadtype "t38": m=image 3456 udptl t38

(C) Echo Cancellation (Identifier 0x11100001):

The info element "Echo Cancellation" contains the information that determines whether the echo cancellation is to be activated or deactivated on the other side. The info element "Echo Cancellation" is not transmitted during fax switchover because the echo cancellation is not modified in this case but remains as it was set for the voice call. With regard to a modem switchover (codec "G.711 64 kbit/s A-law modem transparency", see above), this element is transferred because the echo cancellation must be deactivated in order to allow the data to be transmitted between the modems without errors.

In a possible implementation of the method according to the invention, a proposal is made to use the SDP attribute "ecan" from RFC3108 (Conventions for the use of the Session Description Protocol for ATM Bearer Connections) for the transmittal this information. In this situation, the parameter "directionFlag" is set to "fb" (forward and backward direction), the parameter "ecanEnable" is set according to the Q.765.5 info element to "on" or "off", and the parameter "ecanType" is not used and is set to "-". Example: "a=ecan:fb on-"

With this proposed solution, it also becomes possible for messages to be transported by way of the SIP_T protocol between two media gateway controllers which are required for the modification of the IP bearer for a fax or modem transfer. In addition, interworking between BICC CS2/ISUP+ and SIP-T is possible for these features. Furthermore, the proposed solution also enables interworking between an SIP terminal device and other IP-based solutions for these features.

BRIEF DESCRIPTION OF THE DRAWINGS

Preferred embodiments of the invention will be described in detail in the following with reference to the drawings.

In the drawings.

DETAILED DESCRIPTION OF INVENTION

Figure 1:
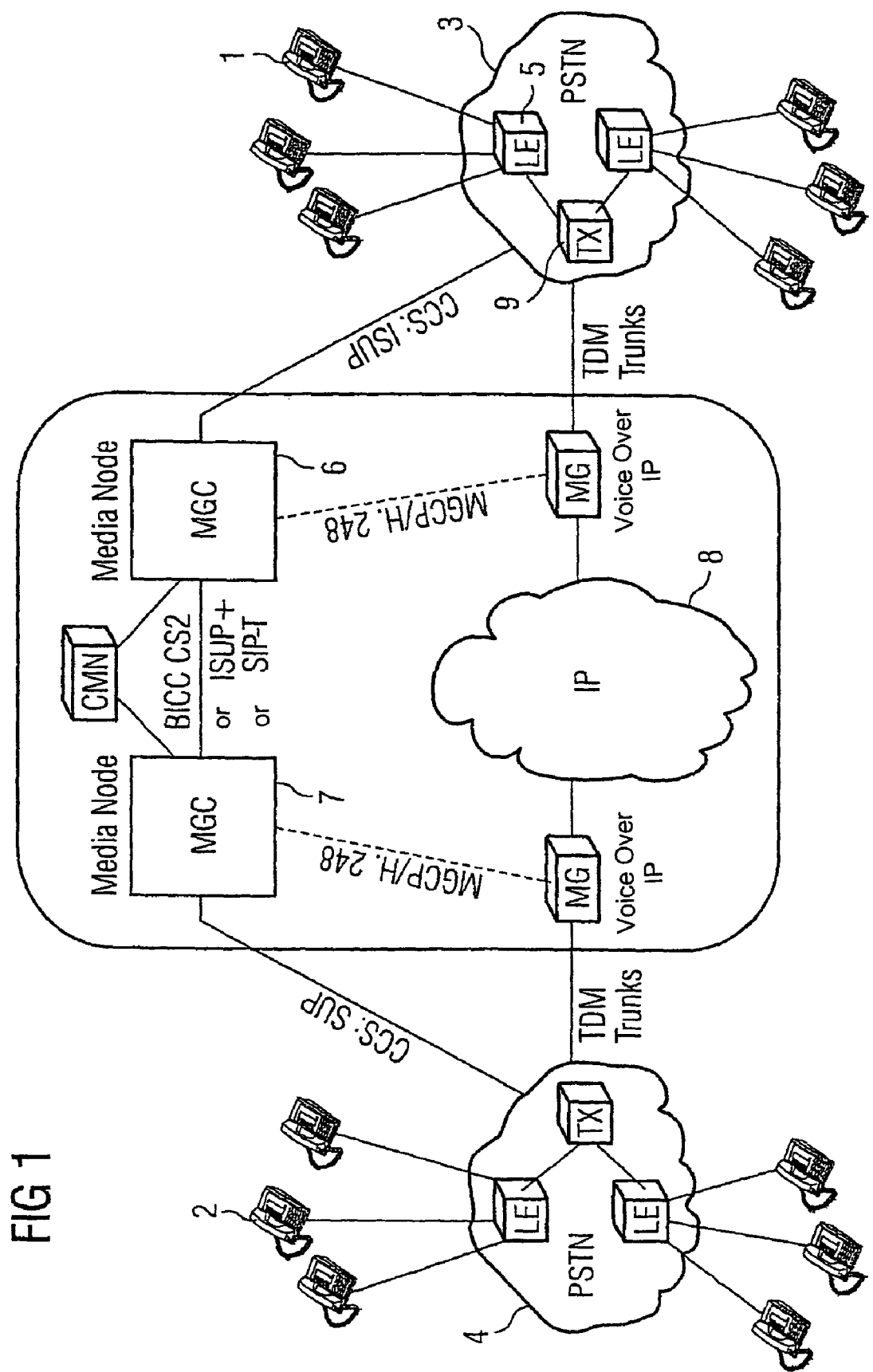
FIG. 1 shows a diagram representing media gateway controller intercommunication.

FIG. 1 shows a schematic representation of media gateway controller intercommunication. This intercommunication is necessary in cases where a disconnection (decomposition) of connection setup and medium or bearer setup is carried out. A subscriber terminal device 1 in a public telephone network (PSTN) 3 requests a connection setup in order to establish a communication connection by way of the associated local exchange (LE) 5 and transit exchange (TX) 9, which is performed separately from the through-connection of a speech/data channel.

The connection setup takes place by means of signaling (CCS:ISUP) to the associated media gateway controller (MGC) 6. This media gateway controller 6 communicates with a second media gateway controller 7, whereby all signaling information is exchanged between the BICC CS2/ISUP+ interfaces of the two controllers 6, 7 by way of Q.765.5 BAT. The second media gateway controller 7 subsequently effects signaling for the telecommunication terminal device 2 of the B subscriber.

Figure 2:
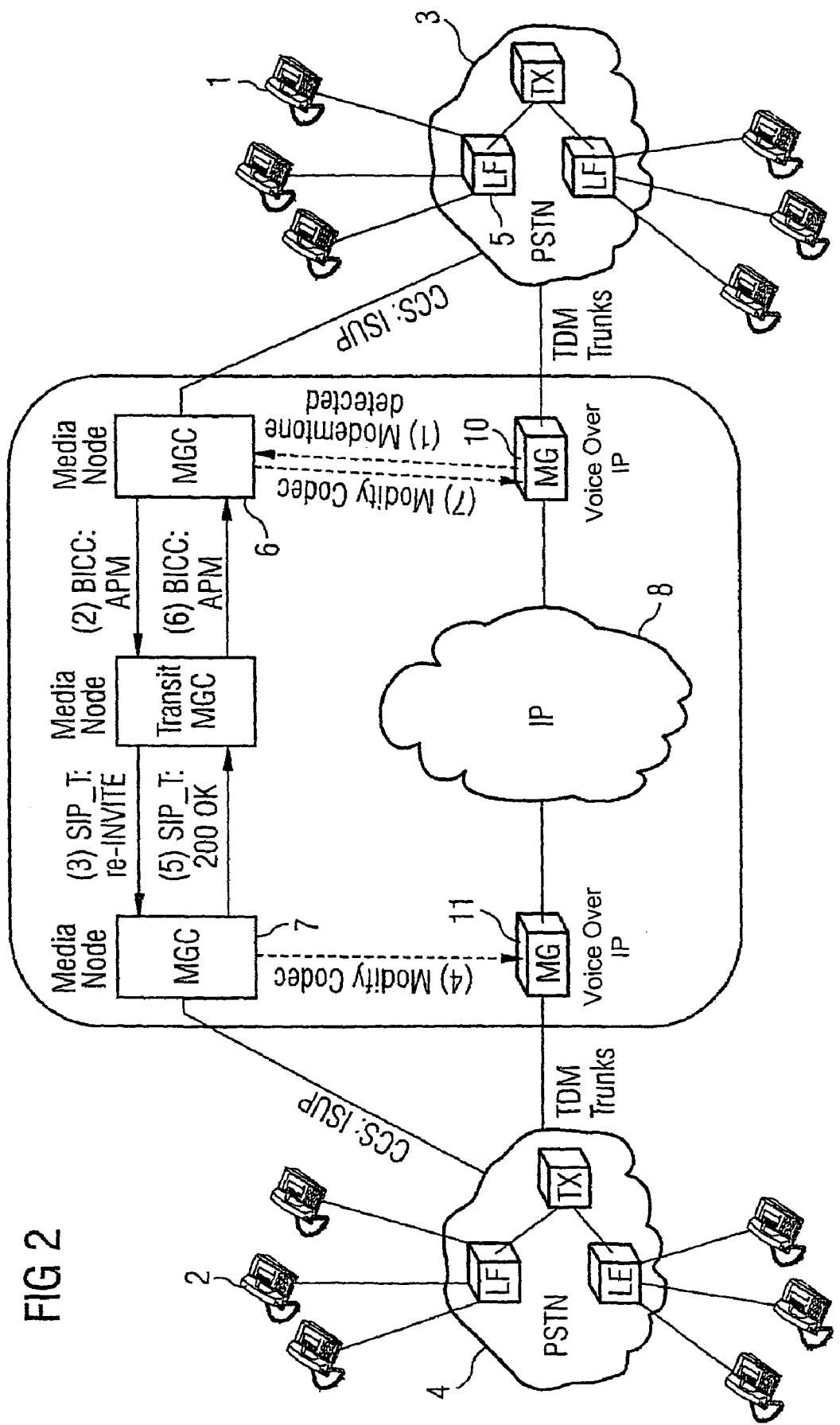
FIG. 2 shows a schematic representation of a first embodiment of the invention.

FIG. 2 shows a schematic representation of a first embodiment of the invention. With regard to the method represented, data is sent from the telecommunication terminal device 1 of an A subscriber to a first media gateway 10 where, on the basis of the data transferred, the ITU-T standard (or the coding type) of the data transmission is determined. The result is then transferred to a first media gateway controller 6, associated with the first media gateway 10, where a codec required for the data transfer operation on the B-channel is determined on the basis of the ITU-T standard ascertained. The result of determining the requisite codec is transferred to a second media gateway controller 7 by means of corresponding signaling.

The second media gateway controller 7 controls an associated second media gateway 11 which constitutes the interface to the telecommunication terminal device 2 of a B subscriber. Subsequently, the first or second media gateway controller 6, 7 in the associated first or second media gateway 10, 11 respectively switches the codec for the B-channel over to the determined codec, required for the data transfer, by means of corresponding signaling.

On the basis of the ITU standard determined for the data transfer, the transfer attributes required for optimum data transfer, particularly Maximum Jitter Buffer Size, Silence Suppression and/or Echo Cancellation, are also determined. This is also transferred with the signaling from the first media gateway controller 6 to the second media gateway controller 7.

The information transfer between the two media gateway controllers 6, 7 occurs in the SDP part of the SIP-SIP-T message as per RFC2327. In this situation, the conversion of the parameters into the SDP protocol takes place in the manner previously described.

Following the transmission of the information between the two media gateway controllers 6, 7, setting of the determined transfer attributes for the codec for optimization of the data transfer operation takes place by means of corresponding signaling from the media gateway controllers 6, 7 to the associated media gateways 10, 11. The signaling for conveying the result of the determination of the codec required for the data transfer operation is thus effected in this situation by means of a mapping of an ISUP message in a SIP message, particularly in an SDP part of the SIP message as per RFC2327, by way of SIP interfaces of the first and second media gateway controllers 6, 7. The signaling between the first and second media gateway controllers 6, 7 and the associated first and second media gateways 10, 11 respectively is advantageously handled by means of the MGC protocol/H.248. However, other protocols can naturally also be considered for use.

Figure 3:
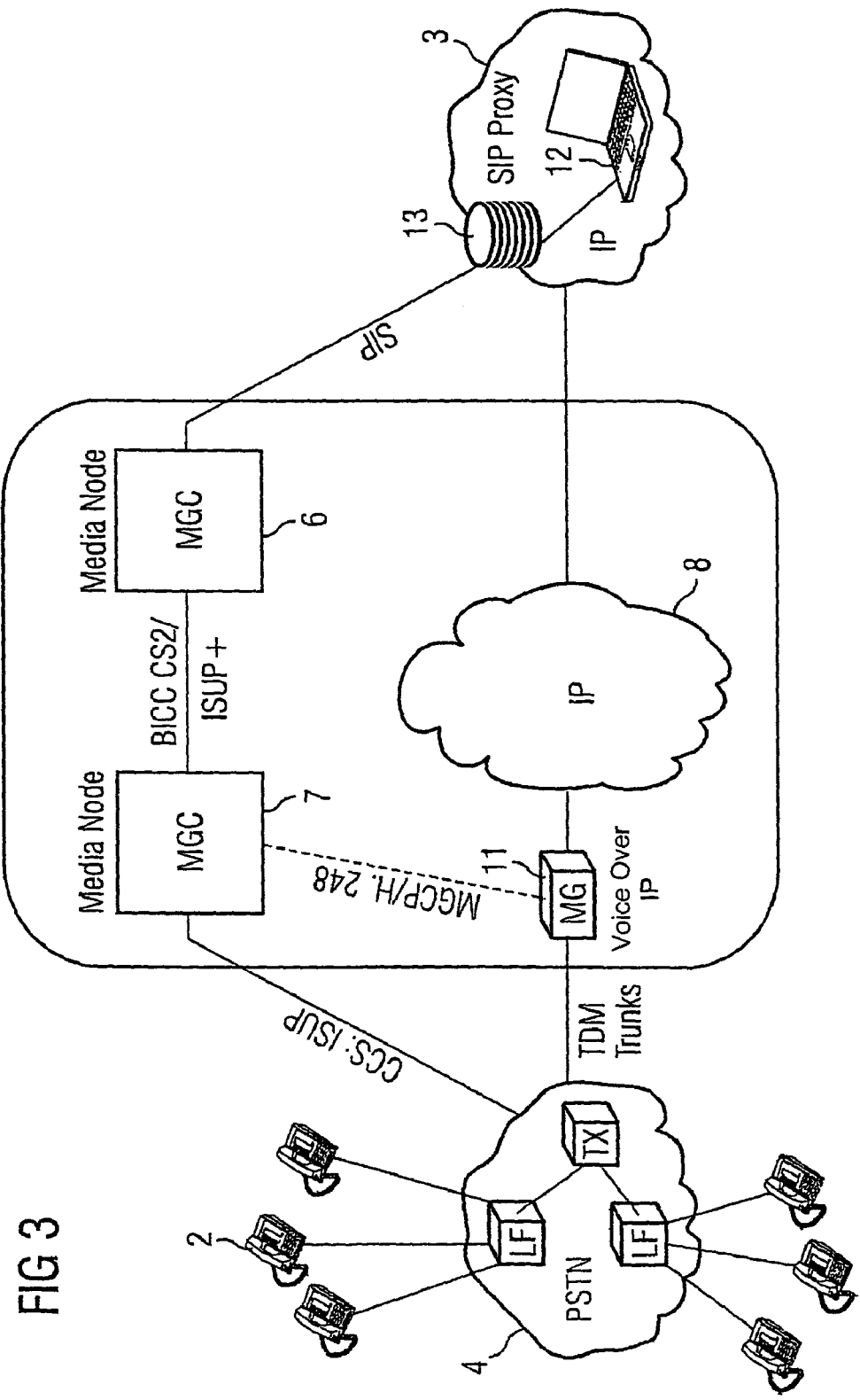
FIG. 3 shows a second embodiment of the invention.

FIG. 3 shows a schematic representation of a first embodiment of the invention. In this embodiment, the subscribers' telecommunication terminal device who is involved in the setup of a communication connection is a SIP client 12 which is connected for communication purposes by way of a SIP proxy 13 to the first media gateway controller 6. It is accordingly assumed that the information required for connection establishment is transferred from the SIP client 12 to the first media gateway controller 6 by means of a SIP protocol. With regard to the intercommunication between the two media gateway controllers 6, 7, the BICC CS2/ISUP+ messages would be converted exactly as described above into SIP messages including the SDP session. This presupposes that the SIP client 12 supports fax or modem transmission.

Other embodiments of the method according to the invention are naturally also conceivable, however. Further possible interworking scenarios would be SIP client intercommunication with a VoIP trunking subscriber, whereby the configuration should be organized as in the case of the second embodiment, except that in this situation a single media gateway controller would suffice instead of two media gateway controllers because one BICC CS2/ISUP+ is dispensed with between exchange signaling.

SIP client intercommunication with an access gateway (HIA7600) or with an H.323 subscriber, VoDSL subscriber or SIP client would also be conceivable.

The invention claimed is:

1. A method for transmitting call control parameters between two media gateway controllers, wherein the call control parameters enable a switchover between a voice transfer mode and a data transfer mode separate from a setup of a medium or bearer connection comprising:
providing a first media gateway controller and a second media gateway controller, the first and second controllers included in an internet protocol (IP) network;
providing a terminal device;
converting the call control parameters into a session initiation protocol (SIP) or session initiation protocol for telephones (SIP-T) message, the call control parameters including a parameter for indicating a codec switchover of the bearer connection in the form of an action indicator in accordance with Q.765.5;
transmitting a session message containing the converted call control parameters;
converting the session message containing the converted call control parameters into a message based on a standard signaling protocol to be transmitted between the two media gateway controllers; and
transmitting the message between the two media gateway controllers based on the standard protocol with the call control parameters.

2. The method according to claim 1, wherein the standard signaling protocol is selected from the group consisting of bearer independent call control protocol and ISDN user part (ISUP).

3. The method according to claim 1, wherein the call control parameters map to a session description protocol part of the session message in accordance with Internet Engineering Task Force Request for Comment No. 2327 (RFC-2327), the session message being transmitted between the controllers.

4. The method according to claim 1, wherein the call control parameters include a switchover parameter indicating a codec switchover of the bearer connection, the switchover parameter implicitly represented in a session description protocol part of the session message and explicitly represented as an action indicator in the standard signaling protocol.

5. The method according to claim 4, wherein the first media gateway controller initiates the codec switchover and sends a session internet protocol reinvite (SIP:re-INVITE) message along with the session description protocol part, the session description protocol part indicating a data transfer codec.

6. The method according to claim 5, wherein the second media gateway controller receives the SIP:re-INVITE message along with the session description protocol part, the session description protocol (SDP) part indicating the data transfer codec, the second media gateway controller generating a first value in the standard signaling protocol.

7. The method according to claim 4, wherein the second media gateway controller performs the codec switchover and sends a SIP:re-INVITE acknowledgement message with the session description protocol part indicating a data transfer codec.

8. The method according to claim 7, wherein the first media gateway controller receives a SIP:re-INVITE acknowledgement message along with the session description protocol part, the session description protocol part indicating the data transfer codec, whereby the first media gateway controller generates a second value in the standard signaling protocol.

9. The method according to 3, wherein the call control parameters include a codec parameter that provides a codec for the data transfer mode.

10. The method according to claim 9, wherein the codec parameter is transmitted within the session description protocol part of the session message, the session description protocol part including a media description field, a codec mapping session description protocol attribute (rtpmap), and a session description protocol attribute parameter (fmtp).

11. The method according to claim 9, wherein the codec parameter is transmitted in the standard signaling protocol, and contains a single codec parameter.

12. The method according to claim 3, wherein the call control parameters contain an echo cancellation parameter indicating activation or deactivation of an echo cancellation.

13. The method according to claim 12, wherein the echo cancellation parameter indicates activation during a switchover to a fax transfer mode, and the echo cancellation parameter indicates deactivation during a switchover to a modem transfer mode.

14. The method according to claim 13, wherein the echo cancellation parameter is transmitted in the session description protocol part of the session message that includes an echo cancellation session description protocol attribute (ecan).

15. The method according to claim 13, wherein the call control parameters contain an echo cancellation transmitted in the standard signaling protocol.

16. The method according to claim 9, wherein the switchover to the data transfer mode causes a bearer connection codec change to G.711, a maximum jitter buffer size of the bearer connection is increased, and a silence suppression of the bearer connection is deactivated.

17. The method according to claim 9, wherein the switchover to the data transfer mode is a T.38 codec.

18. The method according to claim 3, wherein a codec is communicated from the controllers to an associated media gateway in the standard signaling protocol selected from the group consisting of media gateway control protocol (MGCP) and H.248, the codec is communicated after the transfer of the call control parameters between the media gateway controllers.

19. A communications network comprising:
a plurality of telecommunication terminals connected to a public switched telephone network;

a media gateway controller communicating with the public switched telephone network via a standard signaling protocol selected from the group consisting of bearer independent call control protocol and ISUP;

a plurality of media gateways communicating with each other over an internet protocol network and controlled by one or more media gateway controllers;

the media gateway controller transferring call control parameters, the call control parameters being mapped into a session description protocol part of a session message in accordance with RFC-2327 and including a parameter for indicating a codec switchover of the bearer connection in the form of an action indicator in accordance with Q.765.5; and the session message being transmitted between the media gateway controllers according to the session description protocol.

20. The network according to claim 19, wherein the call control parameters include a codec parameter that provides a codec for the data transfer mode, the codec parameter is transmitted within the session description protocol part of the session message, the session description protocol part including a media description field, a session description protocol attribute of rtpmap, and a session description protocol attribute of fmtp.

21. A communications network comprising a first media gateway controller and a second media gateway controller, converting call control parameters into SIP or SIP-T message, the call control parameters including a parameter for indicating a codec switchover of the bearer connection in the form of an action indicator in accordance with Q.765.5;

transmitting the SIP or SIP-T message containing the converted call control parameters;

converting the SIP or SIP-T message containing the converted call control parameters into a message based on a standard signaling protocol to be transmitted between the two media gateway controllers; and transmitting the message between the two media gateway controllers based on the standard protocol with the call control parameters, wherein the call control parameters enable a switchover between a voice transfer mode and a data transfer mode separate from a setup of a medium or bearer connection.

* * * * *